United States Patent [19]

Davey

[11] Patent Number: 4,965,911
[45] Date of Patent: Oct. 30, 1990

[54] DECONTAMINATION OF MEAT

[75] Inventor: Kenneth R. Davey, Seven Hills, Australia

[73] Assignee: Commonwealth Scientific and Industrial Research Organization, Australia

[21] Appl. No.: 353,623

[22] PCT Filed: Aug. 31, 1988

[86] PCT No.: PCT/AU88/00335
§ 371 Date: May 4, 1989
§ 102(e) Date: May 4, 1989

[87] PCT Pub. No.: WO89/01738
PCT Pub. Date: Mar. 9, 1989

[30] Foreign Application Priority Data

Sep. 4, 1987 [AU] Australia ................................ PI4151

[51] Int. Cl.⁵ ............................................. A22C 21/04
[52] U.S. Cl. ........................................ 17/51; 17/14; 134/30; 134/199
[58] Field of Search ................. 17/51, 1 A, 10 A, 14, 17/11.2 A, 15; 134/32, 30, 199, 76

[56] References Cited

U.S. PATENT DOCUMENTS

| 1,296,914 | 5/1962 | Ambill | 17/15 |
| 3,135,016 | 6/1964 | Ekstam et al. | 17/51 |
| 3,178,763 | 4/1965 | Kolman | 17/11.2 |
| 3,343,477 | 9/1967 | Ekstam | 99/234 |
| 3,523,326 | 8/1970 | Ambill | 17/15 |
| 4,337,549 | 7/1982 | Anderson et al. | 17/1 R |
| 4,868,950 | 9/1989 | Harben, Jr. | 17/11.2 |

FOREIGN PATENT DOCUMENTS 0181046  5/1986  European Pat. Off. .

Primary Examiner—Willis Little
Attorney, Agent, or Firm—Sughrue, Mion, Zinn, Macpeak & Seas

[57] ABSTRACT

Decontamination apparatus for decontamination of meat carcasses including a main housing (11), supply means (22) for supplying water to the main housing (11), distribution means (17) for separating the water into a plurality of different sheets (21A, 21B, 21C, 21D) for downward passage through the housing (11), and baffle means (37, 38, 39) located within the housing (11) below the distribution means (17) for deflecting the plurality of different sheets (21A, 21B, 21C, 21D) onto an outer surface of the carcass.

20 Claims, 4 Drawing Sheets

DECONTAMINATION OF MEAT

This invention relates to decontamination of meat and in particular meat carcasses.

The muscle of live, healthy animals such as cattle and sheep are normally sterile but during slaughter micro-organisms from the gastro-intestinal tract and external hide of the animal can be transferred to the surface tissue of the carcass. The presence of such contaminants such as Salmonella or *E. coli* are a potential hazard to human health.

Contamination during slaughter is not uniquely an Australian problem. However the rejection of meat because of contamination and ever-tightening health requirements could jeopardize Australia's position as the world's largest exporter of meat. Thus there is a need for effective reduction of the number of contaminating micro-organisms of a public health significance on the surface of meat carcasses. An effective decontamination operation could also anticipate increasingly stringent demands for improved meat hygiene, permit a relaxation in present post-boning time/temperature requirements for hot boning operations and possibly open the export market for meat from beef cattle which had passed through saleyards prior to slaughter.

A number of methods for decontamination of meat have now been proposed including a naked flame, hot air, steam and hot dilute acetic acid. However the decontamination of meat carcasses using hot water appears to have a number of advantages. The use of hot water results in reliable destruction of micro-organism contaminants, removes loose dirt and does not itself contaminate or impair meat properties. Water is a better heat transfer medium than air-steam, is not as corrosive as acetic acid, is not a chemical additive and is generally economical and readily available. Further, the use of hot water dispels concerns with the build up of resistant strains of bacterial contaminants as might occur with continued use of chemical agents.

Various publications have described the use of hot water for treatment of meat carcasses after slaughter including a publication entitled "Spray Washing of Lamb Carcasses" by C. Bailey Inst. Meat Bull 75,3 (1972) which proposed the use of spray jets of hot water optionally mixed with hypochlorite solution to provide chlorine concentrations of up to 360 parts per million.

In another publication by J. T. Patterson Northern Ireland Ministry Agriculture Rec. Agric. 18 85-87 (1969) there is described a procedure wherein carcasses were washed with hot water from a two minute inside and outside wash with a jet of water and steam.

In another publication by Kelly et al in J. Applied Bacteriol 51 415-424 (1981) lamb carcasses were spray washed with water also containing chlorine. The water was heated by steam injection until it was at the required temperature upon impact with the carcass. A similar process was reported in J. Animal Science 39 4, 674-678 (1974) by Kotula et al.

In an article by Smith and Graham in Meat Science 2 119-128 (1978) the surface tissues of beef and mutton were treated with water heated to 80 degrees C. which was simply poured over the meat samples.

In U.S. Pat. No. 4,337,549 reference is made to animal carcasses being cleaned by a single pass through a cleaning unit having a pair of oscillating spray bar assemblies which were each equipped with a plurality of nozzles arranged to collectively contact all exposed surfaces of the carcass. The cleaning unit was enclosed within an open ended chamber having at either end a vestibular system of baffles for containing the spray liquid while permitting uninhibited passage of the carcasses.

U.S. Pat. No. 4,337,549 did not refer to the use of hot water. However the use of spray nozzles which were used in the majority of the prior art discussed above were found to be disadvantageous because:

(i) the water after it left the spray nozzles rapidly cooled thereby reducing its ability to minimize the number of contaminating micro-organisms;

(ii) the nozzles were usually prone to blockage especially if the water was recycled;

(iii) the use of spray nozzles was relatively expensive because of the need for high pumping pressures and thereby pump and energy costs; and (iv) a mist or fog was often produced largely as a consequence of the atomization of the water in the nozzles.

It is therefore an object of the invention to provide a decontamination apparatus for meat carcasses which will alleviate the abovedescribed problems associated with the prior art.

The invention therefore provides decontamination apparatus for decontamination of meat carcasses which includes:

(i) a main housing;

(ii) supply means for supplying liquid to the main housing;

(iii) distribution means for separating the liquid into a plurality of different sheets for downward passage through the housing;

(iv) means for suspending a carcass in the housing; and (v) baffle means located within the housing below the distribution means for deflecting said plurality of different sheets onto an outer surface of the carcass.

The main housing may be of any suitable type and preferably is of a substantially closed type having a front wall, rear wall, top wall and base wall. There also may be provided a pair of opposed side walls having access slots for the passage therethrough of the carcass. Suitably the main housing has a relatively shallow width. The main housing is suitably cuboidal but it will also be appreciated that the main housing may have any other suitable shape such as cylindrical.

The liquid supply means suitably includes a supply circuit which is preferably closed. However this does not preclude the use of a once through system wherein heated water is pumped through the main housing. A once through system can be utilised with or without recovered heat by heat exchange.

The closed liquid supply circuit is more favoured. However for reasons of economy a suitable closed circuit includes a reservoir, conduits, pump and valves as well as a suitable heat source. Preferably the heat source includes a heating means which is of an electrical nature such as a heating element of conventional type or which uses steam injection. The use of a heat source in the closed liquid circuit is suitably such as to maintain the temperature in the circuit at a suitable temperature.

The distributor means for separating the liquid into the plurality of different planar sheets also may be of any suitable type. In one form the distributor may comprise a multiplicity of partitions which are located in a casing or distributor housing. The hot water may be passed through the distributor housing and thereby be separated into the plurality of sheets by the partitions.

Suitably the partitions are arranged parallel to each other and are also aligned vertically. However this is not essential and the partitions may be aligned obliquely to the vertical or even horizontally if desired with the hot water being introduced from one side of a distributor housing having a plurality of horizontally aligned partitions.

In another possible variation the distributor housing may be divided into a plurality of cylindrical tubes or passages.

In a particularly preferred embodiment the distributor includes a distributor housing having a plurality of vertically oriented partitions so as to provide a series of passages whereby water may follow a tortuous or serpentine flow path. In one suitable arrangement hot water may enter the distributor housing at or adjacent the base thereof and flow upwardly through suitable packing material to even the flow of the water. The water may then flow downwardly to form the plurality of different sheets or walls which are preferably substantially planar.

The suspension means for suspending a carcass in the main housing may suitably comprise a dressing rail which may extend through the distributor housing. However, any other suitable suspension means may be utilised if desired.

The baffle means suitably include a plurality of planar baffle sheets located below the distributor housing and attached to the interior surface of the main housing by appropriate means. Each planar baffle sheet may also include a horizontal flange at a base edge thereof. Suitably the hot water from the distributor housing is deflected by the baffle sheets to the surface of the carcass. To this end the baffle sheets may be located in the form of an upper baffle sheet adjacent one side wall of the distributor housing, an intermediate baffle sheet located adjacent an opposed side wall of the main housing and below or partly below the upper baffle sheet, and a lower baffle sheet located adjacent the same side wall as the upper baffle sheet and located below or partly below the intermediate baffle sheet.

Reference may now be made to a preferred embodiment of the invention as shown in the attached drawings wherein.

Figure 1:
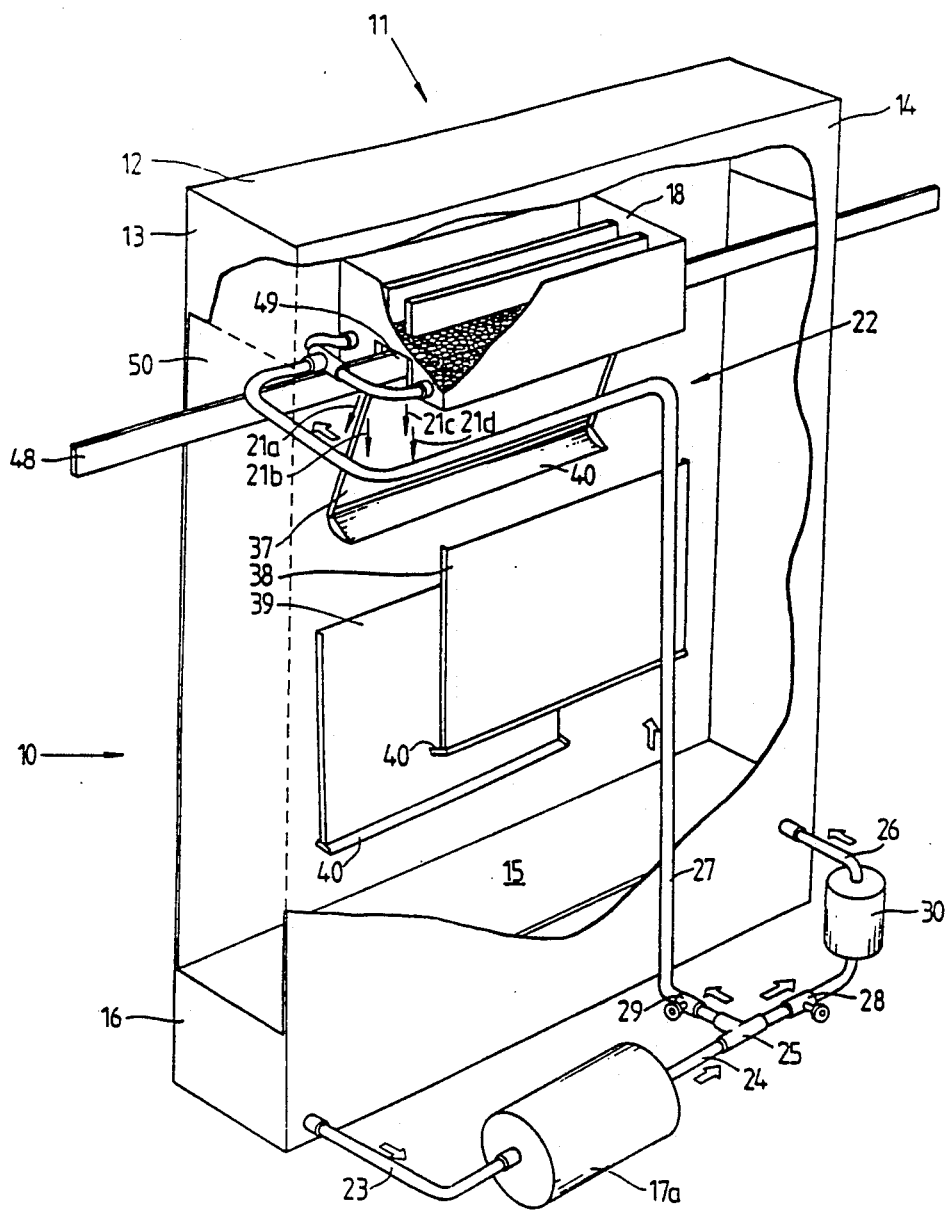
FIG. 1 is a perspective view of decontamination apparatus constructed in accordance with the invention.

In the drawings there is shown decontamination apparatus 10 including main housing 11 having top wall 12, opposed side walls 13 and 14 and base wall or screen 15 as well as hot water reservoir 16. There is also shown distributor means 17 including distributor housing 18, partitions 19 and flow passages 20 and 21 better shown in FIG. 2.

The supply means 22 for supplying hot water to the main housing 11 and in particular the distributor means 17 includes line 23 interconnecting reservoir 16 to pump 17A, line 24 which is forked at 25 into lines 26 and 27, flow valves 28 and 29 and heater 30. As shown hot water from reservoir 16 is pumped into line 26 wherein hot water is recycled to reservoir 16 as well passed into line 27 wherein hot water is passed to distributor means 17.

The distributor means 17 includes inlets 31 wherein hot water is passed up inlet passage 20 through packing 32 formed from plastics material and then out through outlet passages 21 as shown by the arrows in four planar sheets of water 21A, 21B, 21C and 21D. The vertical partitions 19 are of box section forming opposed side walls of outlet passage 21. There is also provided adjustable guides 34 as well as horizontal support member 35 for housing 18.

Figure 2:
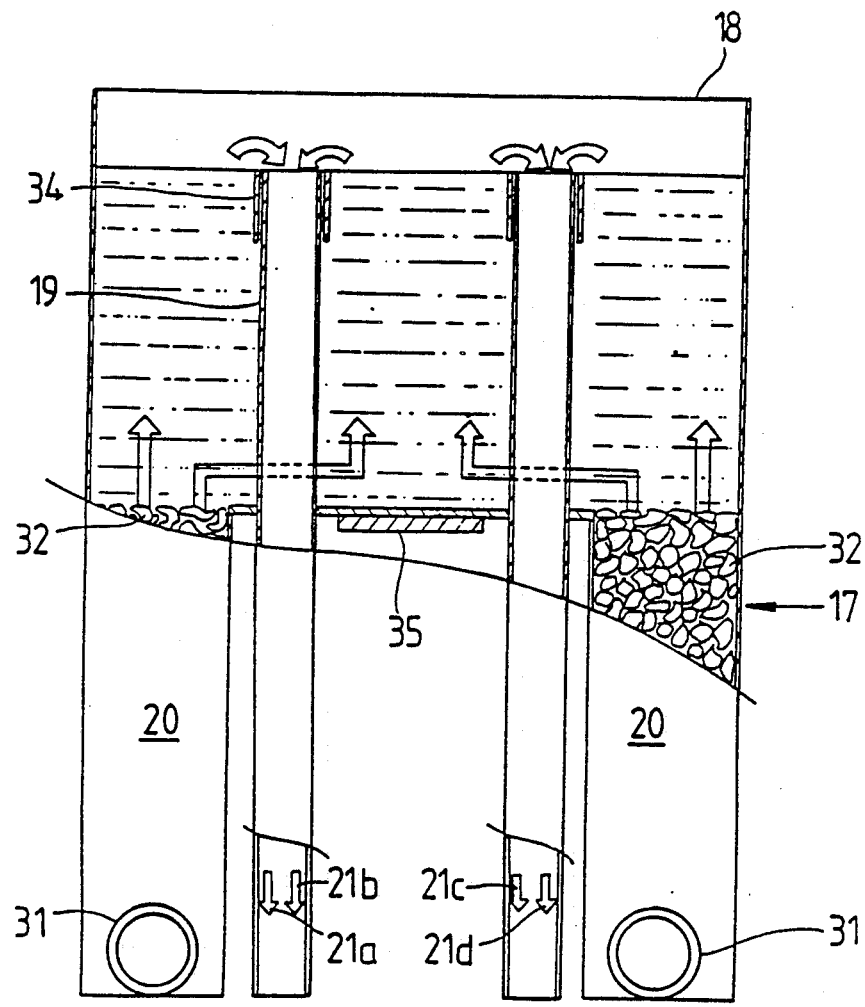
FIG. 2 is a detailed view of the distributor means.

As shown in FIG. 2 the flow passages 21 form planar walls or sheets of hot water 21A, 21B, 21C and 21D which may impinge on baffle plates 37, 38 and 39 as described in detail hereinafter. Each baffle plate includes a base flange 40.

The arrangement of baffle plates 37, 38 and 39 is such that hot water is deflected upon the outer surface of the carcass 41 and especially onto neck 42, thoracic and abdominal cavities 43, rump 44, mid back 45, brisket 46 and shoulder 47. There is also shown dressing rail 48 for supporting carcass 41 which passes through opposed slots 49 in distributor housing 18. The rail 48 also passes through opposed slots 50 in side walls 13.

The low pressure, overhead water distributor means 17, in contrast to existing cabinets with vertical banks of high pressure sprays, was selected in accordance with the present invention because of its simpler construction and greater economy. Cabinet doors (hinged and sliding types) were shown to offer no advantage in reducing heat losses if an uninterrupted throughput of carcasses was to be maintained. The advantages of the distributor method over more conventional pressure sprays stem largely from the reduced surface area of the continuous vertical water wall for heat and evaporative hot water losses at the lower pumping pressures, and that no thermal insulation is required on the surfaces of the distributor cabinet, whereas insulation is necessary for economic running of a spray cabinet because cabinet surfaces opposite spray banks are directly washed with hot water. The outer surfaces of the distributor, recirculation tank and pipe work may be suitably insulated.

The total immersion of carcasses in a large tank of hot water has the advantage of (nearly) total coverage but this is greatly overshadowed by its disadvantages which include:

(i) the need for large (pneumatic or hydraulic) lifts to position the sides;

(ii) the accumulation of particulate matter and fat on top of the water through which the incoming and exiting sides would have to be lifted;

(iii) the need to 'weight' sides to overcome their natural buoyancy; and (iv) the need for relatively large scale apparatus, greater floor space and capital investment.

For the present apparatus the tent like design of the main housing 11 permits it to fit over and around an existing dressing rail 48 without interrupting usual throughput as shown in FIG. 1. The housing walls 12, 14, 15 extended a distance past either end of the distributor to contain some splashing of the water from the carcass as it enters and exits the housing 11. This arrangement of baffles requires the split beef carcasses to enter the main housing orientated in a particular way. The baffles and distribution of water from the four weirs can be clearly seen in FIGS. 1 and 4.

From experimentation it was established that the minimum flow of water necessary for good coverage of the sides was about 3.2 kg per meter of weir length on each weir of the distributor.

In regard to the packing 32, this is not essential to the invention since the need for packing 32 can be avoided by extending the distributor housing 18 to about the height of the outlet of recirculation pump 17A.

EXAMPLE

DECONTAMINATION OF SIDES OF BEEF

*Escherichia coli* was used as the indicator microorganism for decontamination The advantages of *E. coli* include that it is not pathogenic, and that it behaves thermally in a similar way to salmonellae. Conclusions based on studies with *E. coli* were therefore directly applicable to salmonellae.

Figure 3:
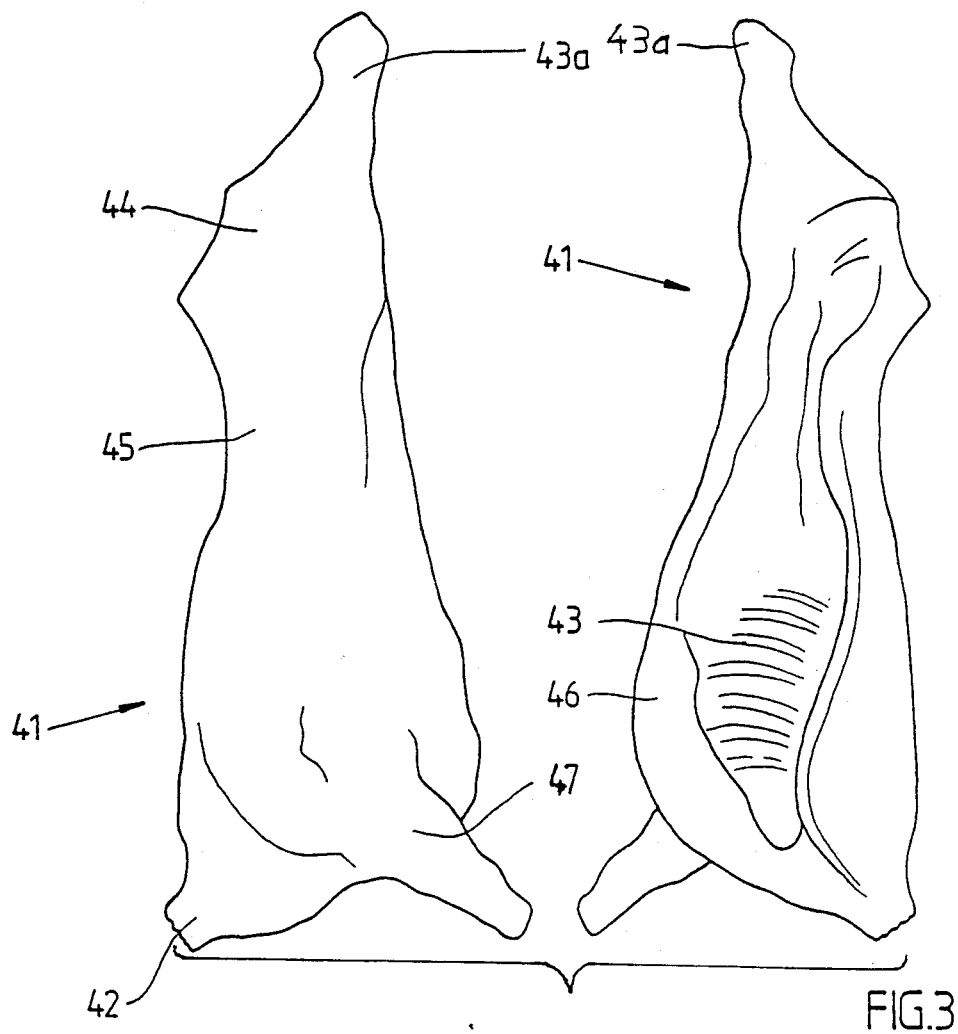
FIG. 3 shows alternative views of a split beef carcass, otherwise known as a "side" or "side of beef"

Sixteen sides of beef with a mean dressed mass of 106.7 kg (range 90.8 to 116.8 kg) were inoculated with *E. coli* at six selected sites and decontaminated within the apparatus with hot water temperatures at the surface tissue (Tf) of either 83.5, 74.2, 66.0 or 44.5 degrees C. for 20 seconds or 10 seconds. The six selected sites were neck (lateral), thoracic cavity, rump, mid back, brisket and shoulder. These are shown schematically in FIG. 3 as respectively, 42, 43, 44, 45, 46 and 47. Tissue samples were excised in duplicate from each of the sites immediately prior to and following decontamination with hot water in the apparatus, and after 24 hours chilling and 48 hours chilling with air temperatures c. zero (minus 1 degree C. to plus 2 degrees C.). In this way the number of viable micro-organisms on at each of the six sites could be determined for each side and possible effects of usual chilling times on carcass bloom noted.

Figure 4:
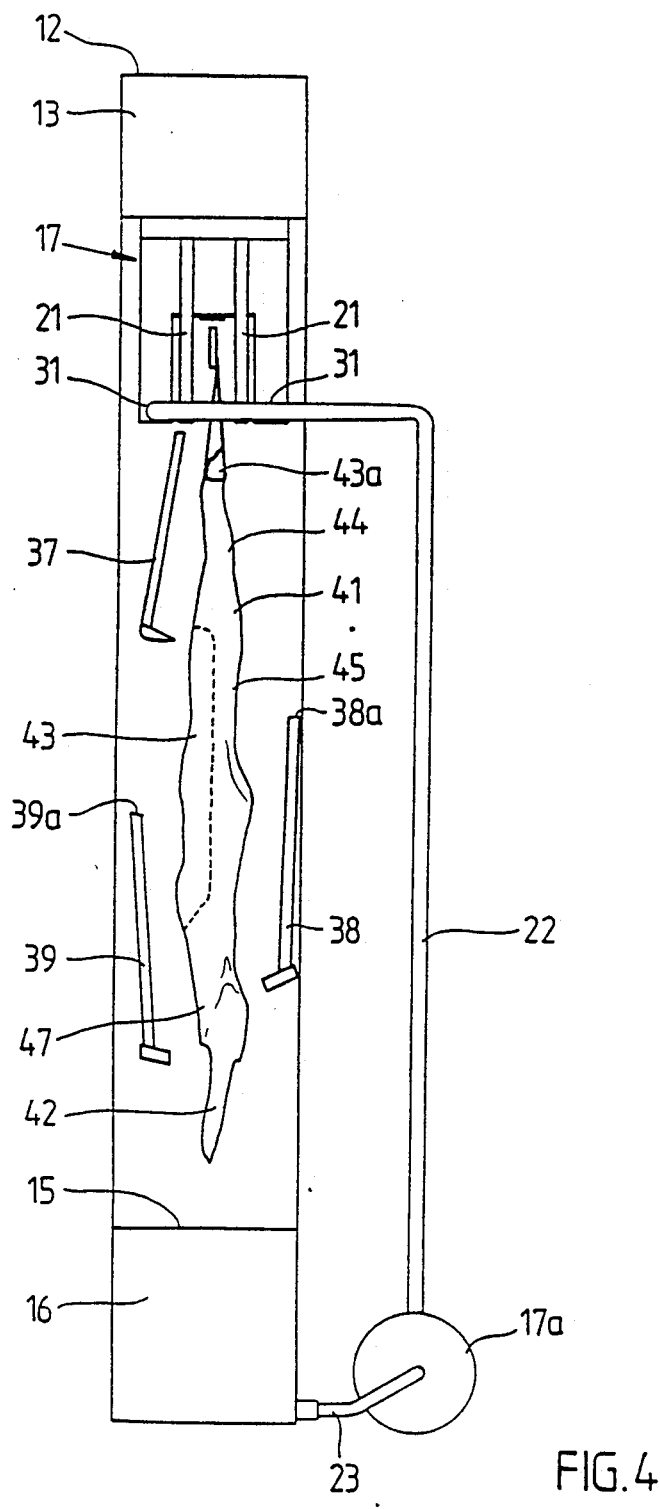
FIG. 4 is a schematic view showing the deflected flow paths of the water caused by the plurality of baffle sheets in relation to the meat carcass.

As best shown in FIG. 4 planar sheets 21A, 21B, 21C and 21D exit from outlet passages 21. Sheet 21A passes behind baffle 39 and subsequently through a slot 39B above base flange 40 to impinge as a lateral deflection upon the thoracic and abdominal cavities 43 of carcass 41. This flow path is also assisted by triangular end plates 39C which may be also part of baffles 38 and 39.

Sheets 21B and 21C impinge directly onto the hock area 43A of carcass 41 as shown. Sheet 21D exits onto rump area 44 and mid back 45 as shown.

Baffles 38 and 39 distribute all water over shoulder 47 and neck areas 42 respectively. Brisket area 46 is also contacted by the action of baffles 38 and 39 in creating lateral deflections of water as shown.

The water may then pass into reservoir 16 through screen 15 as shown.

Baffles 37, 38 and 39 may be adjustable horizontally as well as vertically by movement of support hinges 37A, 38A and 39A relative to distributor housing 17 and main housing Suitable means (not shown) may be provided for this purpose such as a row of slots or the like.

Because there was no significant difference between mean numbers in *E. coli* immediately after decontamination with the apparatus and following chilling at zero degrees C. for either 24 hours or 48 hours, the reductions were lumped to give a mean. Mean log(10) reductions for 20 second exposures were 2.98 at 83.5 degrees C., 2.14 at 74.2 degrees C. and 1.17 at 66.0 degrees C. Reductions for 10 second exposures were respectively 2.33, 1.40 and 0.91. There was no appreciable reduction due to thermal injury in the numbers of viable *E. coli* at 44.5 degrees C. Tf cannot be measured directly but can be computed from a knowledge of the temperature of the inlet water to the main housing and other directly measurable thermal properties.

For the data overall there was a significant difference (P<0.05) between 20 second and 10 second exposures in the linear relationship between mean log reductions and Tf. The overall mean reduction in the numbers of viable *E. coli* (log(N/N$_o$)) can be approximated by:

$$\log (N/N_o) = \frac{Tf - 44.41}{24.77 - 0.5361\, t}$$

Where t is the exposure time of the side in the apparatus.

At a Tf value of 83.5 degrees C. with exposure times greater than 20 seconds overall bloom was permanently impaired. The maximum mean reduction that can be affected on sides of beef is therefore about log 2.98. Extrapolation of the above equation suggests that this could also be achieved with an exposure time of about 27 seconds at 74.2 degrees C. or about 33 seconds at 66.0 degrees C. This was not tested. Assessment of bloom was facilitated by direct comparison with sides that had not been decontaminated but which were from animals that had been slaughtered at about the same time and chilled together with the decontaminated sides. The impairment of bloom might be taken as an indication of the extent of decontamination, no objective means of assessing the impairment of surface tissue however is available.

The variation between overall mean reductions at each of the six sites was highly significant (P<0.001; Table 1).

TABLE 1

OVERALL MEAN LOG REDUCTION AT EACH OF THE SIX SAMPLE SITES AND FOUR TEMPERATURES MEAN LOG(10) REDUCTION

| SITE | neck | cavity | rump | mid back | brisket | shoulder |
|------|------|--------|------|----------|---------|----------|
|      | 0.88 | 1.52   | 1.75 | 0.99     | 2.18    | 1.05     |

Greatest reductions were on the brisket, rump and cavity. The brisket and rump are sites usually considered a high risk for contamination. Least reductions were on the shoulder, mid back and in the lateral surfaces of the neck. Logically, this is due to the fact that the water exiting the neck was coolest, but also this is thought to be due to the highly folded nature of the surface tissue at the neck with its many crevices which probably shield bacteria. Because reductions are lowest on the neck it is important that this site be considered when specifying minimum reductions required.

Conclusions

1. The novel housing can be used to successfully decontaminate sides of beef using hot water. Because of the need for uniform flows of water the housing distributor must be aligned carefully in use.

2. Advantages of the distributor housing include its logical simplicity, it does not impede usual chain throughput, and it permits a continuous flow of carcasses to enter the cabinet spaced at the regular intervals determined by the dressing chain spacing. A 'standard' housing can be used to accommodate a wide range of throughputs by adjusting only the inlet water temperature to the distributor. This facilitates manufacture of the preferred 'stand alone' design.

3. Design parameters are based on the microbial reduction needed on the neck, the site of minimum treatment. For beef sides, it is expected that a log 1 (90%) reduction can be achieved with a typical export production of 135 sides/h using inlet water temperatures c. 66 degrees C. for between 1.5 and 3 cents per side spaced at usual intervals of 1.2 m. This is less than 0.016 percent of the value of low cost manufacturing meat.

4. Comparison with an existing spray cabinet showed that greater reductions can be obtained with the distributor cabinet and that it is appreciably more cost effective in achieving reductions and will result in lower capital costs.

I claim:

1. Decontamination apparatus for decontamination of meat carcasses including:
  (i) a main housing;
  (ii) supply means for supplying liquid to the main housing;
  (iii) distribution means for separating the liquid into a plurality of different sheets for downward passage through the housing;
  (iv) means for suspending a carcass in the housing; and
  (v) baffle means located within the housing below the distribution means for deflecting said plurality of different sheets onto an outer surface of the carcass.

2. Decontamination apparatus as claimed in claim 1 wherein the main housing has a pair of opposed access slots for passage of the carcass.

3. Decontamination apparatus as claimed in claim 2 wherein the suspension means includes a dressing rail extending through the main housing via said pair of opposed access slots.

4. Decontamination apparatus as claimed in claim 1 wherein the liquid supply means is a closed circuit including a reservoir, pump means, flow control valves, heat source and associated conduits.

5. Decontamination apparatus as claimed in claim 4 wherein the reservoir is located in a base part of the main housing below the baffle means.

6. Decontamination apparatus as claimed in claim 1 wherein the distribution means includes a distributor housing having a multiplicity of separate flow passages for conveying said plurality of different sheets.

7. Decontamination apparatus as claimed in claim 6 wherein the multiplicity of separate flow passages are caused by a plurality of spaced partitions in said distributor housing.

8. Decontamination apparatus as claimed in claim 7 wherein each spaced partition is hollow thereby forming an outlet liquid flow passage.

9. Decontamination apparatus as claimed in claim 7 wherein inlet flow passages for upward flow of liquid are formed by spaces wherein each respective space is interposed between each partition.

10. Decontamination apparatus as claimed in claim 6 wherein said flow passages are divided into inlet flow passages for upward flow of liquid and outlet flow passages for downward flow of liquid.

11. Decontamination apparatus as claimed in claim 9 wherein each inlet flow passage has packing contained therein.

12. Decontamination apparatus as claimed in claim 1 wherein the baffle means includes a plurality of baffle plates so positioned and arranged in the main housing to cause deflection of liquid onto carcass locations comprising one or more of the following:
  (vi) the neck;
  (vii) thoracic cavity;
  (viii) rump;
  (ix) back;
  (x) brisket; and
  (xi) shoulder.

13. Decontamination apparatus as claimed in claim 12 wherein the plurality of baffle plates include a primary baffle plate for causing a first transverse or lateral liquid flow deflection.

14. Decontamination apparatus as claimed in claim 13 wherein there are provided secondary and tertiary baffle plates in substantially opposed relationship for causing a second transverse or lateral flow deflection followed by a third transverse or lateral flow deflection.

15. Decontamination apparatus as claimed in claim 12 wherein each baffle plate is substantially planar and also has a base flange normal thereto.

16. Decontamination apparatus as claimed in claim 1 wherein each of the plurality of different sheets are substantially planar.

17. Decontamination apparatus for decontamination of meat carcasses including:
  (xii) a main housing;
  (xiii) suspension means for suspending a meat carcass in the main housing;
  (xiv) supply means for supplying liquid to the main housing;
  (xv) distribution means associated with the supply means for separating the liquid into a plurality of different planar sheets for downward passage through the main housing; and
  (xvi) a plurality of baffles to cause deflection of liquid onto carcass locations selected from the following:
    (i) the neck;
    (ii) thoracic cavity;
    (iii) rump;
    (iv) back;
    (v) brisket; and
    (vi) shoulder.

18. Decontamination apparatus as claimed in claim 17 wherein the plurality of baffle plates include a primary baffle plate for causing a first transverse or lateral liquid flow deflection, a secondary baffle plate for causing a second transverse or lateral flow deflection and a tertiary baffle plate for causing a third transverse or lateral liquid flow deflection.

19. A method of decontamination of meat carcasses including the steps of:
  (xvii) passing a plurality of meat carcasses through a housing below a plurality of separate substantially planar sheets of liquid; and
  (xviii) treating each respective meat carcass with a deflected jet of liquid whereby respective jets of liquid are caused to impinge on carcass locations selected from the following:
    (i) the neck;
    (ii) thoracic cavity;
    (iii) rump;
    (iv) back;
    (v) brisket; and
    (vi) shoulder; and
  (iii) withdrawing each treated meat carcass from the housing.

20. Decontamination apparatus for decontamination of meat carcasses including:
  (xix) a main housing;
  (xx) suspension means for suspending a meat carcass in the main housing;
  (xxi) supply means for supplying liquid to the main housing;
  (xxii) distribution means associated with the supply means for separating the liquid into a plurality of different streams or planar sheets for downward passage through the main housing;

(xxiii) a plurality of baffles in the main housing and below the distribution means including a primary baffle, a secondary baffle and a tertiary baffle wherein the primary baffle is located above the secondary and tertiary baffle and wherein the secondary and tertiary baffle are oriented in substantially opposed relationship whereby said plurality of different streams or planar sheets of liquid are subject to a first lateral deflection, a second lateral deflection and a third lateral deflection whereby said liquid impinges on the meat carcass on the following locations:

(i) the neck;
(ii) thoracic cavity;
(iii) rump;
(iv) back;
(v) brisket; and
(vi) shoulder.

* * * * *